United States Patent
Xing et al.

(10) Patent No.: US 11,363,581 B2
(45) Date of Patent: Jun. 14, 2022

(54) RESOURCE ALLOCATION DETERMINATION METHOD, RESOURCE ALLOCATION INDICATION METHOD, USER EQUIPMENT AND NETWORK DEVICE

(71) Applicant: CHINA ACADEMY OF TELECOMMUNICATIONS TECHNOLOGY, Beijing (CN)

(72) Inventors: Yanping Xing, Beijing (CN); Xuejuan Gao, Beijing (CN); Tony Ekpenyong, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 85 days.

(21) Appl. No.: 16/652,017

(22) PCT Filed: Sep. 26, 2018

(86) PCT No.: PCT/CN2018/107558
§ 371 (c)(1),
(2) Date: Mar. 27, 2020

(87) PCT Pub. No.: WO2019/062748
PCT Pub. Date: Apr. 4, 2019

(65) Prior Publication Data
US 2020/0267698 A1    Aug. 20, 2020

(30) Foreign Application Priority Data

Sep. 30, 2017  (CN) .......................... 201710919955.0

(51) Int. Cl.
*H04W 72/12*  (2009.01)
*H04L 5/00*  (2006.01)
*H04W 72/04*  (2009.01)

(52) U.S. Cl.
CPC ......... *H04W 72/042* (2013.01); *H04L 5/0046* (2013.01); *H04W 72/1273* (2013.01); *H04W 72/1289* (2013.01); *H04W 72/0453* (2013.01)

(58) Field of Classification Search
CPC ............... H04W 72/042; H04W 72/02; H04W 72/0453; H04W 72/1289; H04W 72/1273; H04L 5/0046; H04L 5/00; H04L 5/0053
See application file for complete search history.

(56) References Cited

U.S. PATENT DOCUMENTS

2012/0014330 A1  1/2012  Damnjanovic et al.
2015/0063231 A1  3/2015  Seo et al.
(Continued)

FOREIGN PATENT DOCUMENTS

CN    102668673 A    9/2012
CN    105099634 A    11/2015
(Continued)

OTHER PUBLICATIONS

First office action and search report from CN app. No. 201710919955. 0, dated Mar. 4, 2020, with English translation from Global Dossier.
(Continued)

*Primary Examiner* — Jae Y Lee
*Assistant Examiner* — Aixa A Guadalupe Cruz
(74) *Attorney, Agent, or Firm* — Ladas & Parry, LLP (57) ABSTRACT

A resource allocation determination method, a resource allocation indication method, a UE and a network device are provided. The resource allocation determination method applied for the UE includes: determining the quantity N of bits of a resource allocation indication field in DCI; determining a BWP where a data channel is located based on the DCI; and determining resource allocation for the data chan-
(Continued)

nel in the BWP where the data channel is located based on information about the resource allocation indication field in the DCI.

12 Claims, 5 Drawing Sheets

(56) References Cited

U.S. PATENT DOCUMENTS

| | | | |
|---|---|---|---|
| 2017/0135105 A1 | 5/2017 | Li et al. | |
| 2017/0155489 A1 | 6/2017 | Kim et al. | |
| 2019/0281537 A1* | 9/2019 | Kim | H04W 48/12 |
| 2020/0112944 A1* | 4/2020 | Jiang | H04W 72/042 |
| 2020/0120642 A1* | 4/2020 | Hwang | H04L 5/005 |
| 2020/0235894 A1* | 7/2020 | Takeda | H04L 5/0092 |

FOREIGN PATENT DOCUMENTS

| | | |
|---|---|---|
| EP | 3664549 A1 | 7/2018 |
| WO | 2018171413 A1 | 9/2018 |

OTHER PUBLICATIONS

Extended European Search Report from EP app. No. 18861820.1, dated Aug. 11, 2020.
First office action and search report from TW app. No. 107134016, dated Jul. 3, 2020, with machine English translation.
International Search Report from PCT/CN2018/107558, dated Dec. 19, 2018, with English translation provided by WIPO.
Written Opinion of the International Searching Authority from PCT/CN2018/107558, dated Dec. 19, 2018, with English translation provided by WIPO.
International Preliminary Report on Patentability from PCT/CN2018/107558, dated Mar. 31, 2020, with English translation from WIPO.
"DL Resource Allocation Aspects", R1-1708017, 3GPP TSG RAN WG1 Meeting #89, Hangzhou, China, May 15-19, 2017.
"Wider Bandwidth Operations", R1-1710761, 3GPP TSG RAN EG1 NR Ad-Hoc#2, Qingdao, P.R. China, Jun. 27-30, 2017.
"Remaining issues on bandwidth part configuration and activation", R1-1715692, 3GPP TSF RAN WG1 Meeting NR#3, Nagoya, Japan, Sep. 18-21, 2017.
"Remaining aspects for carrier aggregation and bandwidth parts", R1-1716327, 3GPP TSF RAN WG1 Meeting NR#3, Nagoya, Japan, Sep. 18-21, 2017.
"Status Report to TSG", RP-171783, 3GPP TSG RAN meeting #77, Sapporo, Japan, Sep. 11-14, 2017.
"Status Report to TSG", RP-1711505, 3GPP TSG RAN meeting #76, West Palm Beach, USA, Jun. 5-8, 2017.
Notification of Reason for Refusal from KR app. No. 10-2020-7010752, dated Feb. 24, 2021, with English translation from Global Dossier.
"Resource allocation for PDSCH/PUSCH", R1-17118048, 3GPP TSG RAN WG1 Meeting 90bis, Prague, CZ, Oct. 9-13, 2017.
Catt, "PDSCH and PUSCH resource allocation", R1-1717833, 3GPP TSG RAN WG1 Meeting 90bis, Prague, CZ, Oct. 9-13, 2017, all pages.
Notice of Reasons for Refusal from JP app. No. 2020-517920, dated Aug. 17, 2021, with English translation provided by Global Dossier, all pages.

\* cited by examiner

RESOURCE ALLOCATION DETERMINATION METHOD, RESOURCE ALLOCATION INDICATION METHOD, USER EQUIPMENT AND NETWORK DEVICE

CROSS-REFERENCE, TO RELATED APPLICATIONS

The present application is the U.S. national phase of PCT Application No. PCT/CN2018/107558 filed on Sep. 26, 2018, which claims a priority to Chinese patent application No. 201710919955.0 filed on Sep. 30, 2017, the disclosures of which are incorporated herein by reference in their entireties

TECHNICAL FIELD

The present disclosure relates to the field of communication technology, in particular to a resource allocation determination method, a resource allocation indication method, a User Equipment (UE), and a network device.

BACKGROUND

Along with an increase in a carrier bandwidth in a New Radio (NR) system, an NR UE may not be able to support the transmission and reception of data at a full bandwidth. Hence, such a concept as Bandwidth Part (BWP) has been introduced into the NR system. The BWP is a subset of consecutive Physical Resource Blocks (PRBs) in one carrier. A plurality of BWPs may be configured for the UE, and the NR system supports the dynamical switching of an active BWP for the UE through scheduling Downlink Control Information (DCI). The UE is merely capable of receiving and transmitting data at the active BWP.

The NR system supports a Resource Block Group (RBG)-based resource allocation mode and a Resource Indication Value (RIV)-based resource allocation mode. RBG refers to a group of consecutive Resource Blocks (RBs). The RBs in each BWP are divided into groups based on a size of RBG, and then whether each RBG is allocated is indicated in the DCI in the form of a bitmap. The quantity of bits of the bitmap is determined based on the quantity of RBGs, the quantity of the RBGs is associated with a size of the BWP and the size of the RBG, and the size of the RBG is determined based on the size of the BWP or notified by a network device. In the RIV-based resource allocation mode, initial RB serial numbers and the quantity of the RBs are encoded jointly so as to allocate the consecutive RBs, and the quantity of bits in the DCI for the resource allocation is associated with the size of the BWP and a resource allocation granularity.

Based on the above, the quantity of bits in the DCI required for frequency-domain resource allocation in the NR system is associated with the BWP. For different BWPs, the quantities of the bits required for the frequency-domain resource allocation may be different. When the BWP where a data channel is located is supported to be dynamically indicated through the DCI, the BWP for the transmission of the DCI may be different from, or may not correspond to, the BWP for the transmission of the data channel. For example, for downlink scheduling, a BWP where a Physical Downlink Shared Channel (PDSCH) is located may be different from a BWP where a Physical Downlink Control Channel (PDCCH) carrying scheduling information is located. For Frequency Division Duplexing (FDD) uplink scheduling, an uplink BWP where a Physical Uplink Shared Channel (PUSCH) is located may not be a downlink BWP corresponding to a PDCCH carrying scheduling information.

A frequency-domain resource allocation information field in the DCI is used to indicate the frequency-domain resource allocation for the data channel. Hence, as a direct method, the quantity of the bits required for the frequency-domain resource allocation in the DCI is determined based on the BWP where the data channel is located. However, before the DCI is decoded accurately by the UE, it is impossible for the UE to determine the BWP where the data channel scheduled by the DCI is located.

Currently, there is no scheme for determining the frequency-domain resource allocation in the DCI in the case that the BWP where the data channel is located is dynamically indicated in the DCI. In a simple processing mode, the quantity of the bits for the frequency-domain resource allocation is fixedly determined by the BWP with the maximum quantity of the bits required for the frequency-domain resource allocation. Obviously, this mode leads to an increase in the overhead for air-interface signaling and a decrease in a resource utilization rate of the system.

SUMMARY

An object of the present disclosure to provide a resource allocation determination method, a resource allocation indication method, a UE and a network device, so as to determine a size of a resource allocation indication field in the DCI based on a BWP where a control channel carrying the DCI is located, thereby to reduce the unnecessary signaling overhead.

In one aspect, the present disclosure provides in some embodiments a resource allocation determination method for a UE, including: determining the quantity N of bits of a resource allocation indication field in DCI; determining a BWP where a data channel is located based on the DCI; and determining resource allocation for the data channel in the BWP where the data channel is located based on information about the resource allocation indication field in the DCI.

In a possible embodiment of the present disclosure, the determining the resource allocation for the data channel in the BWP where the data channel is located based on the information about the resource allocation indication field in the DCI includes: determining the quantity L of RBGs in the BWP where the data channel is located; when N is not smaller than L, determining the resource allocation of L RBGs for the data channel in the BWP where the data channel is located based on the information about the resource allocation indication field in the DCI; and when N is smaller than L, determining the resource allocation of N RBGs for the data channel in the BWP where the data channel is located based on the information about the resource allocation indication field in the DCI.

In a possible embodiment of the present disclosure, the determining the resource allocation of the N RBGs for the data channel in the BWP where the data channel is located based on the information about the resource allocation indication field in the DCI includes determining N RBGs having highest frequencies in the L RBGs as the N RBGs, or determining N RBGs having lowest frequencies in the L RBGs as the N RBGs.

In a possible embodiment of the present disclosure, the determining the resource allocation for the data channel in the BWP where the data channel is located based on the information about the resource allocation indication field in the DCI includes: determining the quantity M of bits for the resource allocation in the BWP where the data channel is located; when N is not smaller than M, determining the allocation of frequency-domain resources for the data channel in the BWP where the data channel is located based on information about the M bits in the N bits of the resource allocation indication field in the DCI; and when N is smaller than M, determining the allocation of the frequency-domain resources for the data channel in the BWP where the data channel is located based on information about the N bits of the resource allocation indication field in the DCI.

In a possible embodiment of the present disclosure, when N is not smaller than M, the determining the allocation of the frequency-domain resources for the data channel in the BWP where the data channel is located based on the information about the M bits in the N bits of the resource allocation indication field in the DCI includes determining M most significant bits in the N bits as the M bits, or determining M least significant bits in the N bits as the M bits.

In a possible embodiment of the present disclosure, when N is smaller than M, the determining the allocation of the frequency-domain resources for the data channel in the BWP where the data channel is located based on the information about the N bits of the resource allocation indication field in the DCI includes determining N least significant bits in the M bits as the N bits, or determining N most significant bits in the M bits as the N bits.

In another aspect, the present disclosure provides in some embodiments a resource allocation indication method for a network device, including: determining the quantity N of bits of a resource allocation indication field in DCI; indicating a BWP where a data channel is located through the DCI; and indicating resource allocation for the data channel in the BWP where the data channel is located in the resource allocation indication field through the N bits.

In a possible embodiment of the present disclosure, the indicating the resource allocation for the data channel in the BWP where the data channel is located in the resource allocation indication field through the N bits includes: determining the quantity L of RBGs in the BWP where the data channel is located; when N is not smaller than L, indicating the resource allocation of L RBGs for the data channel in the BWP where the data channel is located in the resource allocation indication field through the N bits; and when N is smaller than L, indicating the resource allocation of N RBGs for the data channel in the BWP where the data channel is located in the resource allocation indication field through the N bits.

In a possible embodiment of the present disclosure, the indicating the resource allocation of the N RBGs for the data channel in the BWP where the data channel is located in the resource allocation indication field through the N bits includes determining N RBGs having highest frequencies in the L RBGs as the N RBGs, or determining N RBGs having lowest frequencies in the L RBGs as the N RBGs.

In a possible embodiment of the present disclosure, the indicating the resource allocation for the data channel in the BWP where the data channel is located in the resource allocation indication field through the N bits includes: determining the quantity M of bits for resource allocation in the BWP where the data channel is located; when N is not smaller than M, indicating the allocation of frequency-domain resources for the data channel in the BWP where the data channel is located based on information about the M bits in the N bits of the resource allocation indication field in the DCI; and when N is smaller than M, indicating the allocation of the frequency-domain resources for the data channel in the BWP where the data channel is located based on information about the N bits of the resource allocation indication field in the DCI.

In a possible embodiment of the present disclosure, when N is not smaller than M, the indicating the allocation of the frequency-domain resources for the data channel in the BWP where the data channel is located based on the information about the M bits in the N bits of the resource allocation indication field in the DCI includes determining M most significant bits in the N bits as the M bits, or determining M least significant bits in the N bits as the M bits.

In a possible embodiment of the present disclosure, when N is smaller than M, the indicating the allocation of the frequency-domain resources for the data channel in the BWP where the data channel is located based on the information about the N bits of the resource allocation indication field in the DCI includes determining N least significant bits in the M bits as the N bits, or determining N most significant bits in the M bits as the N bits.

In yet another aspect, the present disclosure provides in some embodiments a UE, including: a calculation module configured to determine the quantity N of bits of a resource allocation indication field in DCI; a BWP determination module configured to determine a BWP where a data channel is located based on the DCI; and a resource allocation determination module configured to determine resource allocation for the data channel in the BWP where the data channel is located based on information about the resource allocation indication field in the DCI.

In a possible embodiment of the present disclosure, the resource allocation determination module includes: a third calculation unit configured to determine the quantity L of RBGs in the BWP where the data channel is located; and a first determination unit configured to, when N is not smaller than L, determine the resource allocation of L RBGs for the data channel in the BWP where the data channel is located based on the information about the resource allocation indication field in the DCI, and when N is smaller than L, determine the resource allocation of N RBGs for the data channel in the BWP where the data channel is located based on the information about the resource allocation indication field in the DCI.

In a possible embodiment of the present disclosure, the N RBGs are N RBGs having highest frequencies in the L RBGs, or N RBGs having lowest frequencies in the L RBGs.

In a possible embodiment of the present disclosure, the resource allocation determination module includes: a fourth calculation unit configured to determine the quantity M of bits for the resource allocation in the BWP where the data channel is located; and a second determination unit configured to, when N is not smaller than M, determine the allocation of frequency-domain resources for the data channel in the BWP where the data channel is located based on information about the M bits in the N bits of the resource allocation indication field in the DCI, and when N is smaller than M, determine the allocation of the frequency-domain resources for the data channel in the BWP where the data channel is located based on information about the N bits of the resource allocation indication field in the DCI.

In a possible embodiment of the present disclosure, when N is not smaller than M, the M bits are M most significant bits in the N bits, or M least significant bits in the N bits.

In a possible embodiment of the present disclosure, when N is smaller than M, the N bits are N least significant bits in the M bits, or N most significant bits in the M bits.

In still yet another aspect, the present disclosure provides in some embodiments a network device, including: a calculation module configured to determine the quantity N of bits of a resource allocation indication field in DCI; a BWP indication module configured to indicate a BWP where a data channel is located through the DCI; and a resource allocation indication module configured to indicate resource allocation for the data channel in the BWP where the data channel is located in the resource allocation indication field through the N bits.

In a possible embodiment of the present disclosure, the resource allocation indication module includes: a third calculation unit configured to determine the quantity L of RBGs in the BWP where the data channel is located; and a first indication unit configured to, when N is not smaller than L, indicate the resource allocation of L RBGs for the data channel in the BWP where the data channel is located in the resource allocation indication field through the N bits, and when N is smaller than L, indicate the resource allocation of N RBGs for the data channel in the BWP where the data channel is located in the resource allocation indication field through the N bits.

In a possible embodiment of the present disclosure, the N RBGs are N RBGs having highest frequencies in the L RBGs, or N RBGs having lowest frequencies in the L RBGs.

In a possible embodiment of the present disclosure, the resource allocation indication module includes: a fourth calculation unit configured to determine the quantity M of bits for resource allocation in the BWP where the data channel is located; and a second indication unit configured to, when N is not smaller than M, indicate the allocation of frequency-domain resources for the data channel in the BWP where the data channel is located based on information about the M bits in the N bits of the resource allocation indication field in the DCI, and when N is smaller than M, indicate the allocation of the frequency-domain resources for the data channel in the BWP where the data channel is located based on information about the N bits of the resource allocation indication field in the DCI.

In a possible embodiment of the present disclosure, when N is not smaller than M, the M bits are M most significant bits in the N bits, or M least significant bits in the N bits.

In a possible embodiment of the present disclosure, when N is smaller than M, the N bits are N least significant bits in the M bits, or N most significant bits in the M bits.

In still yet another aspect, the present disclosure provides in some embodiments a UE, including a memory, a processor, a transceiver, and a computer program stored in the memory and executed by the processor. The processor is configured to execute the computer program so as to implement the above-mentioned resource allocation determination method.

In still yet another aspect, the present disclosure provides in some embodiments a network device, including a memory, a processor, a transceiver, and a computer program stored in the memory and executed by the processor. The processor is configured to execute the computer program so as to implement the above-mentioned resource allocation indication method.

In still yet another aspect, the present disclosure provides in some embodiments a computer-readable storage medium storing therein a computer program. The computer program is executed by a processor so as to implement the above-mentioned resource allocation indication method.

The present disclosure has the following beneficial effect. According to the embodiments of the present disclosure, when the BWP where the data channel is located is indicated by the network device through the DCI or an active BWP is switched by the network device through the DCI, the BWP where a control channel carrying the DCI may be determined, and then the quantity N of the bits of the resource allocation indication field in the DCI may be determined based on the BWP where the control channel is located. As a result, it is able to determine a size of the resource allocation indication field in the DCI based on the BWP where the control channel carrying the DCI, rather than to determine the size of the resource allocation indication field for each BWP based on the BWP with the maximum quantity of the bits, thereby to reduce the overhead of air-interface signaling, and improve a resource utilization rate of a system.

DETAILED DESCRIPTION

The present disclosure will be described hereinafter in conjunction with the drawings and embodiments. The following embodiments are for illustrative purposes only, but shall not be used to limit the scope of the present disclosure.

An object of the present disclosure is to provide a resource allocation determination method, a resource allocation indication method, a UE and a network device, so as to determine a size of a resource allocation indication field in the DCI based on a BWP where a control channel carrying the DCI is located, thereby to reduce the unnecessary signaling overhead.

Figure 1:
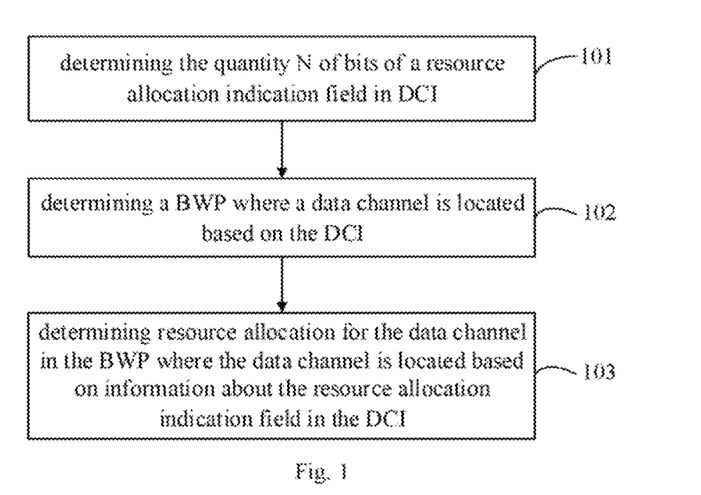
FIG. 1 is a flow chart of a resource allocation determination method according to one embodiment of the present disclosure.

The present disclosure provides in some embodiments a resource allocation determination method applied for a UE which, as shown in FIG. 1, includes: Step 101 of determining the quantity N of bits of a resource allocation indication field in DCI; Step 102 of determining a BWP where a data channel is located based on the DCI; and Step 103 of determining resource allocation for the data channel in the BWP where the data channel is located based on information about the resource allocation indication field in the DCI.

According to the embodiments of the present disclosure, it is able to determine a size of the resource allocation indication field in the DCI based on a current BWP, rather than to determine the size of the resource allocation indication field for each BWP by a BWP with the maximum quantity of the bits, thereby to reduce the overhead of air-interface signaling, and improve a resource utilization rate of a system.

In some embodiments of the present disclosure, the method may specifically include determining the quantity N of the bits of the resource allocation indication field in the DCI.

In a possible embodiment of the present disclosure, the method may further include: determining the BWP where the data channel is located based on the DCI; and determining the resource allocation for the data channel in the BWP where the data channel is located based on the information about the resource allocation indication field in the DCI.

In some embodiments of the present disclosure, the determining the resource allocation for the data channel in the BWP where the data channel is located based on the information about the resource allocation indication field in the DCI may include: determining the quantity L of RBGs in the BWP where the data channel is located; when N is not smaller than L, determining the resource allocation of L RBGs for the data channel in the BWP where the data channel is located based on the information about the resource allocation indication field in the DCI; and when N is smaller than L, determining the resource allocation of N RBGs for the data channel in the BWP where the data channel is located based on the information about the resource allocation indication field in the DCI.

In a possible embodiment of the present disclosure, the determining the resource allocation of the N RBGs for the data channel in the BWP where the data channel is located based on the information about the resource allocation indication field in the DCI may include determining N RBGs having highest frequencies in the L RBGs as the N RBGs, or determining N RBGs having lowest frequencies in the L RBGs as the N RBGs.

In a possible embodiment of the present disclosure, the determining the resource allocation for the data channel in the BWP where the data channel is located based on the information about the resource allocation indication field in the DCI may include: determining the quantity M of bits for the resource allocation in the BWP where the data channel is located; when N is not smaller than M, determining the allocation of frequency-domain resources for the data channel in the BWP where the data channel is located based on information about the M bits in the N bits of the resource allocation indication field in the DCI; and when N is smaller than M, determining the allocation of the frequency-domain resources for the data channel in the BWP where the data channel is located based on information about the N bits of the resource allocation indication field in the DCI.

In a possible embodiment of the present disclosure, when N is not smaller than M, the determining the allocation of the frequency-domain resources for the data channel in the BWP where the data channel is located based on the information about the M bits in the N bits of the resource allocation indication field in the DCI may include determining M most significant bits in the N bits as the M bits, or determining M least significant bits in the N bits as the M bits.

In a possible embodiment of the present disclosure, when N is smaller than M, the determining the allocation of the frequency-domain resources for the data channel in the BWP where the data channel is located based on the information about the N bits of the resource allocation indication field in the DCI may include determining N least significant bits in the M bits as the N bits, or determining N most significant bits in the M bits as the N bits.

Figure 2:
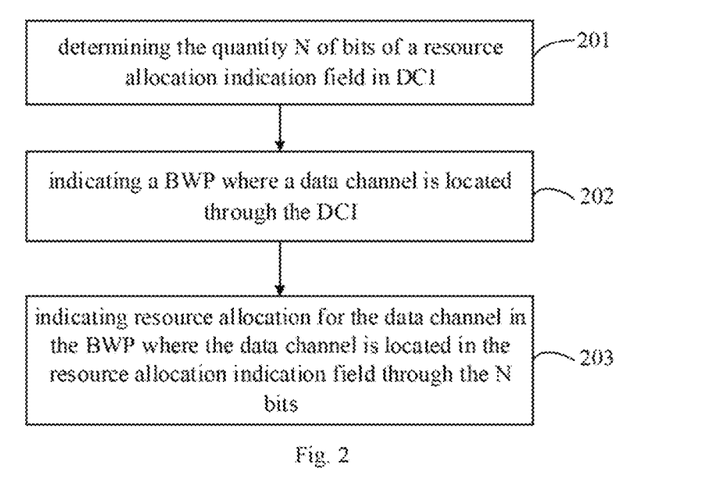
FIG. 2 is a flow chart of a resource allocation indication method according to one embodiment of the present disclosure.

The present disclosure further provides in some embodiments a resource allocation indication method applied for a network device which, as shown in FIG. 2, includes: Step 201 of determining the quantity N of bits of a resource allocation indication field in DCI; Step 202 of indicating a BWP where a data channel is located through the DCI; and Step 203 of indicating resource allocation for the data channel in the BWP where the data channel is located in the resource allocation indication field through the N bits.

According to the embodiments of the present disclosure, it is able to determine a size of the resource allocation indication field in the DCI based on a BWP where a control channel carrying the DCI is located, rather than to determine the size of the resource allocation indication field for each BWP by a BWP with the maximum quantity of the bits, thereby to reduce the overhead of air-interface signaling, and improve the resource utilization rate of the system.

In some embodiments of the present disclosure, the method may specifically include determining the quantity N of the bits of the resource allocation indication field in the DCI.

In a possible embodiment of the present disclosure, the method may further include: indicating the BWP where the data channel is located through the DCI; and indicating resource allocation for the data channel in the BWP where the data channel is located in the resource allocation indication field through the N bits.

In a possible embodiment of the present disclosure, the indicating the resource allocation for the data channel in the BWP where the data channel is located in the resource allocation indication field through the N bits may include: determining the quantity L of RBGs in the BWP where the data channel is located; when N is not smaller than L, indicating the resource allocation of L RBGs for the data channel in the BWP where the data channel is located in the resource allocation indication field through the N bits; and when N is smaller than L, indicating the resource allocation of N RBGs for the data channel in the BWP where the data channel is located in the resource allocation indication field through the N bits.

In a possible embodiment of the present disclosure, the indicating the resource allocation of the N RBGs for the data channel in the BWP where the data channel is located in the resource allocation indication field through the N bits may include determining N RBGs having highest frequencies in the L RBGs as the N RBGs, or determining N RBGs having lowest frequencies in the L RBGs as the N RBGs.

In a possible embodiment of the present disclosure, the indicating the resource allocation for the data channel in the BWP where the data channel is located in the resource allocation indication field through the N bits may include: determining the quantity M of bits for resource allocation in the BWP where the data channel is located; when N is not smaller than M, indicating the allocation of frequency-domain resources for the data channel in the BWP where the data channel is located based on information about the M bits in the N bits of the resource allocation indication field in the DCI; and when N is smaller than M, indicating the allocation of the frequency-domain resources for the data channel in the BWP where the data channel is located based on information about the N bits of the resource allocation indication field in the DCI.

In a possible embodiment of the present disclosure, when N is not smaller than M, the indicating the allocation of the frequency-domain resources for the data channel in the BWP where the data channel is located based on the information about the M bits in the N bits of the resource allocation indication field in the DCI may include determining M most significant bits in the N bits as the M bits, or determining M least significant bits in the N bits as the M bits.

In a possible embodiment of the present disclosure, when N is smaller than M, the indicating the allocation of the frequency-domain resources for the data channel in the BWP where the data channel is located based on the information about the N bits of the resource allocation indication field in the DCI may include determining N least significant bits in the M bits as the N bits, or determining N most significant bits in the M bits as the N bits.

The resource allocation determination method will be described hereafter in more details in conjunction with the embodiments.

First Embodiment

Figure 3:
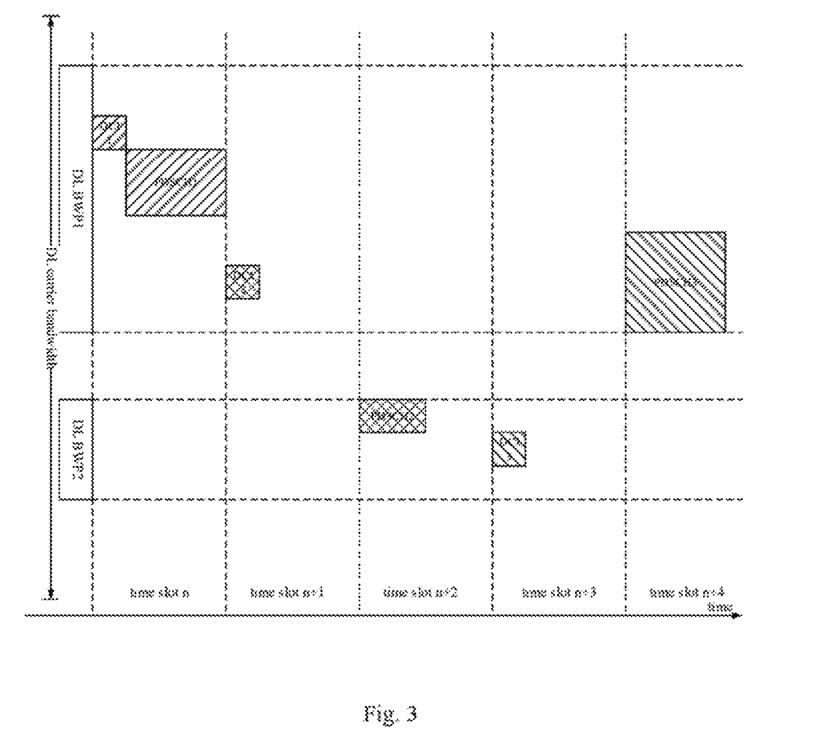
FIG. 3 is a schematic view showing a situation where two downlink BWPs are configured by a network device for a UE during the downlink scheduling.

In this embodiment, the resource allocation determination method will be described by taking the downlink scheduling as an example. It is presumed that two downlink BWPs, i.e., a DL BWP 1 and a DL BWP 2, are configured by the network device for the UE, and a PDSCHi is scheduled by DCIi, where i=1, 2, 3, as shown in FIG. 3.

The UE may determine the quantity N of the bits of the resource allocation indication field in the DCI based on a BWP where a PDCCH carrying the DCI. The quantity of bits of a resource allocation indication field in DCI1 may be N1, the quantity of bits of a resource allocation indication field in DCI2 may be N2, and the quantity of bits of a resource allocation indication field in DCI3 may be N3. A BWP where the PDSCH is located may be indicated by the DCI. The UE may determine a frequency-domain resource for the PDSCH in the BWP indicated by the DCI where the PDSCH is located based on the information about the N-bit resource allocation indication field in the DCI.

The following description will be given on the basis of two resource allocation modes.

(1) RBG-Based Resource Allocation Mode

It is presumed that the quantity of RBGs in the BWP is L, and a value of L is associated with a size of the BWP and a size of each RBG. The size of the RBG may be determined based on the size of the BWP or notified by the network device. The quantity of the RBGs in the BWP 1 may be L1, and the quantity of the RBGs in the BWP 2 may be L2, where L1>L2.

In the RBG-based frequency-domain resource allocation mode, the N bits in the DCI may be used to indicate the resource allocation of the N RBGs in the form of a bitmap. The UE may determine the quantity N of the bits for the RBG resource allocation in the DCI based on the BWP where the PDCCH carrying the DCI is located. To be specific, in the DCI transmitted at the BWP 1, the quantity of bits for the RBG resource allocation may be L1, and in the DCI transmitted at the BWP 2, the quantity of bits for the RBG resource allocation may be L2.

Upon the receipt of the DCI from the network device, the UE may determine the BWP where the PDSCH is located based on the information in the DCI, and determine the resource allocation for the PDSCH in L' RBGs in the BWP where the PDSCH is located based on the information about the N-bit RBG resource allocation indication field in the DCI, where L'≤L, and L represents the quantity of the RBGs in the BWP where the PDSCH is located. When N≥L, L'=L, i.e., the DCI may be used to indicate all the RBGs in the BWP where the PDSCH is located. In some embodiments of the present disclosure, when N>L, L bits in the N bits may be used to indicate the resource allocation of L RBGs in the BWP where the PDSCH is located. When N<L, L'=N, i.e., the DCI may be merely used to indicate a part of the RBGs in the BWP where the PDSCH is located, and the part of the RBGs may include N RBGs. Positions of the N RBGs in the L RBGs may be predefined or notified by the network device.

To be specific, for example, the DCI 1 may be transmitted in the BWP 1, and the quantity of the bits in the DCI 1 indicating information about the RBG resource allocation may be determined based on the BWP 1, i.e., N1=L1. The DCI 1 may be used to indicate that a PDSCH 1 is located in the BWP 1, and the quantity of the RBGs in the BWP 1 may be L1. The quantity of the bits for the RBG resource allocation in the DCI 1 may be the same as the quantity of the RBGs in the BWP where the PDSCH is located, and N1 bits in the DCI may be used to indicate the resource allocation of the L1 RBGs in the BWP 1.

The DCI 2 may be transmitted in the BWP 1, and the quantity of the bits indicating the information about the RBG resource allocation in the DCI 2 may be determined based on the BWP 1, i.e., N2=L1. The DCI 2 may be used to indicate that a PDSCH 2 is located in the BWP 2, and the quantity of the RBGs in the BWP 2 may be L2. The quantity of the bits for the RBG resource allocation in the DCI 2 may be greater than the quantity of the RBGs in the BWP where the PDSCH is located, N2=L1>L2, and L2 bits in the N2 bits in the DCI 2 may be used to indicate the resource allocation of L2 RBGs in the BWP 2. The L2 bits may be L2 least significant or most significant bits in the N2 bits.

The DCI 3 may be transmitted in the BWP 2, and the quantity of the bits indicating the information about the RBG resource allocation in the DCI 3 may be determined based on the BWP 2, i.e., N3=L2. The DCI 3 may be used to indicate that a PDSCH 3 is located in the BWP 1, and the quantity of the RBGs in the BWP 1 may be L1. The quantity of the bits for the RBG resource allocation in the DCI 3 may be smaller than the quantity of the RBGs in the BWP where the PDSCH is located, N3=L2<L1, and the DCI may be merely used to indicate a part of the RBGs in the BWP 1. To be specific, N3 bits in the DCI 3 may be used to indicate the resource allocation of N3 RBGs in the BWP 1. The N3 RBGs may be a subset of L1 RBGs. For example, the N3 RBGs may be N3 RBGs having lowest frequencies or highest frequencies in the L1 RBGs.

(2) RIV-Based Resource Allocation Mode

In the RIV-based resource allocation mode, L bits may be used to indicate the allocation of a set of consecutive RBs, and a value of L may be determined based on the quantity of RBs in the BWP and resource allocation granularity. For example, when the resource allocation granularity is one RB, $$L = \left\lceil \log_2 \frac{K \times (K+1)}{2} \right\rceil,$$

where K represents the quantity of RBs in the BWP. The quantity of the bits for the RB allocation in the downlink BWP 1 may be L1, the quantity of the bits for the RB allocation in the downlink BWP 2 may be L2, and it is assumed 1>L2.

The UE may determine the quantity N of the bits for the RB allocation in the DCI based on the BWP where the PDCCH carrying the DCI is located. To be specific, the quantity of bits for the RB resource allocation in the DCI transmitted in the BWP 1 may be L1, and the quantity of bits for the RB resource allocation in the DCI transmitted in the BWP 2 may be L2.

Upon the receipt of the DCI from the network device, the UE may determine the BWP where the PDSCH is located based on the information in the DCI, and determine the RB resource allocation for the PDSCH in the BWP where the PDSCH is located based on the information about the N-bit RB resource allocation indication field in the DCI. When N≥L, L bits in the N bits in the DCI may be used to indicate the RB resource allocation in the BWP where the PDSCH is located, and when N<L, the N bits in the DCI may be used to indicate the RB resource allocation in the BWP where the PDSCH is located.

To be specific, for example, the DCI 1 may be transmitted in the BWP 1, and the quantity of the bits indicating the information about the RB resource allocation in the DCI 1 may be determined based on the BWP 1, i.e., N1=L1. The DCI 1 may be used to indicate that the PDSCH 1 is located in the BWP 1, and the quantity of the bits for the RB resource allocation in the BWP 1 may be L1. The quantity of the bits for the RB resource allocation in the DCI 1 may be the same as the quantity of the bits for the RB resource allocation in the BWP where the PDSCH is located, and N1 bits in the DCI may be used to indicate the RB resource allocation in the BWP 1.

The DCI 2 may be transmitted in the BWP 1, and the quantity of the bits indicating the information about the RB resource allocation in the DCI 2 may be determined based on the BWP 1, i.e., N2=L1. The DCI 2 may be used to indicate that the PDSCH 2 is located in the BWP 2, and the quantity of the bits for the RB resource allocation in the BWP 2 may be L2. The quantity of the bits for the RB resource allocation in the DCI 2 may be greater than the quantity of the bits for the RB resource allocation in the BWP where the PDSCH is located, N2=L1>L2, and L2 bits in the N2 bits in the DCI 2 may be used to indicate the RB resource allocation in the BWP 2. The L2 bits may be L2 least or most significant bits in the N2 bits.

The DCI 3 may be transmitted in the BWP 2, and the quantity of bits indicating the information about the RB resource allocation in the DCI 3 may be determined based on the BWP 2, i.e., N3=12. The DCI 3 may be used to indicate that the PDSCH 3 is located in the BWP 1, and the quantity of the bits for the RB resource allocation in the BWP 1 may be L1. The quantity of the bits for the RB resource allocation in the DCI 3 may be smaller than the quantity of the bits for the RB resource allocation in the BWP where th PDSCH is located, N3=L2<L1, and N3 bits in the DCI 3 may be used to indicate the RB resource allocation in the BWP 1. The N3 bits may be N3 least or most significant bits in the L2 bits.

Alternatively, the quantity of RBs in the downlink BWP 1 may be K1, the quantity of RBs in the downlink BWP 2 may be K2, and K1>K2. The resource allocation for the PDSCH in K' RBs in the BWP where the PDSCH is located may be determined based on the N-bit information about the RB resource allocation in the DCI, and K'≤K, where K represents the quantity of the RBs in the BWP where the PDSCH is located. When N≥L, K'=K, i.e., the DCI may be used to indicate all the RBs in the BWP where the PDSCH is located. In some embodiments of the present disclosure, when N>L, L bits in the N bits may be used to indicate the resource allocation of K RBs in the BWP where the PDSCH is located. When N<L, the DCI may be merely used to indicate one RB subset in the BWP, and the RB subset may include K' RBs, where K' represents the quantity of the RBs in the BWP where the PDCCH carrying the DCI is located or the maximum quantity of the RBs capable of being indicated by the N bits. Positions of the K' RBs in the K RBs may be predefined or notified by the network device.

To be specific, the DCI 1 may be transmitted in the BWP 1, and the quantity of the bits indicating the information about the RB resource allocation in the DCI 1 may be determined based on the BWP 1, i.e., N1=L1. The DCI 1 may be used to indicate that the PDSCH 1 is located in the BWP 1, the quantity of the RBs in the BWP 1 may be K1, and the quantity of the bits indicating the RB resource allocation may be L1. The quantity of the bits for the RB resource allocation in the DCI 1 may be the same as the quantity of the bits for the RB resource allocation in the BWP where the PDSCH is located, N1=L1, and N1 bits in the DCI may be used to indicate the resource allocation of K1 RBs in the BWP 1.

The DCI 2 may be transmitted in the BWP 1, and the quantity of the bits indicating the information about the RB resource allocation in the DCI 2 may be determined based on the BWP 1, i.e., N2=L1. The DCI 2 may be used to indicate that the PDSCH 2 is located in the BWP 2, the quantity of the RBs in the BWP 2 may be K2, and the quantity of the bits indicating the RB resource allocation may be L2. The quantity of the bits for the RB resource allocation in the DCI 2 may be greater than the quantity of the bits for the RB resource allocation in the BWP where the PDSCH is located, N2=L1>L2, and L2 bits in the N2 bits in the DCI may be used to indicate the resource allocation of K2 RBs in the BWP 2.

The DCI 3 may be transmitted in the BWP 2, and the quantity of the bits indicating the information about the RB resource allocation in the DCI 3 may be determined based on the BWP 2, i.e., N3=L2. The DCI 3 may be used to indicate that the PDSCH 3 is located in the BWP 1, the quantity of the RBs in the BWP 1 may be K1, and the quantity of the bits for the RB resource allocation may be L1. The quantity of the bits for the RB resource allocation in the DCI 3 may be smaller than the quantity of the bits for the RB resource allocation in the BWP where the PDSCH is located, N3=L2<L1, N3 bits in the DCI may be used to indicate the resource allocation of X RBs in the BWP 1, and X<K1. To be specific, X=K2, or X is the maximum quantity of the RBs capable of being indicated by the N3 bits, i.e., X is a maximum positive integer that meets the formula $$N3 \geq \left\lceil \log_2 \frac{X(X+1)}{2} \right\rceil.$$

Positions of the X RBs in the K1 RBs in the BWP 1 may be predefined or notified by the network device. For example, the X RBs may be X RBs having lowest frequencies or highest frequencies in the K1 RBs as predefined or notified.

Second Embodiment

Figure 4:
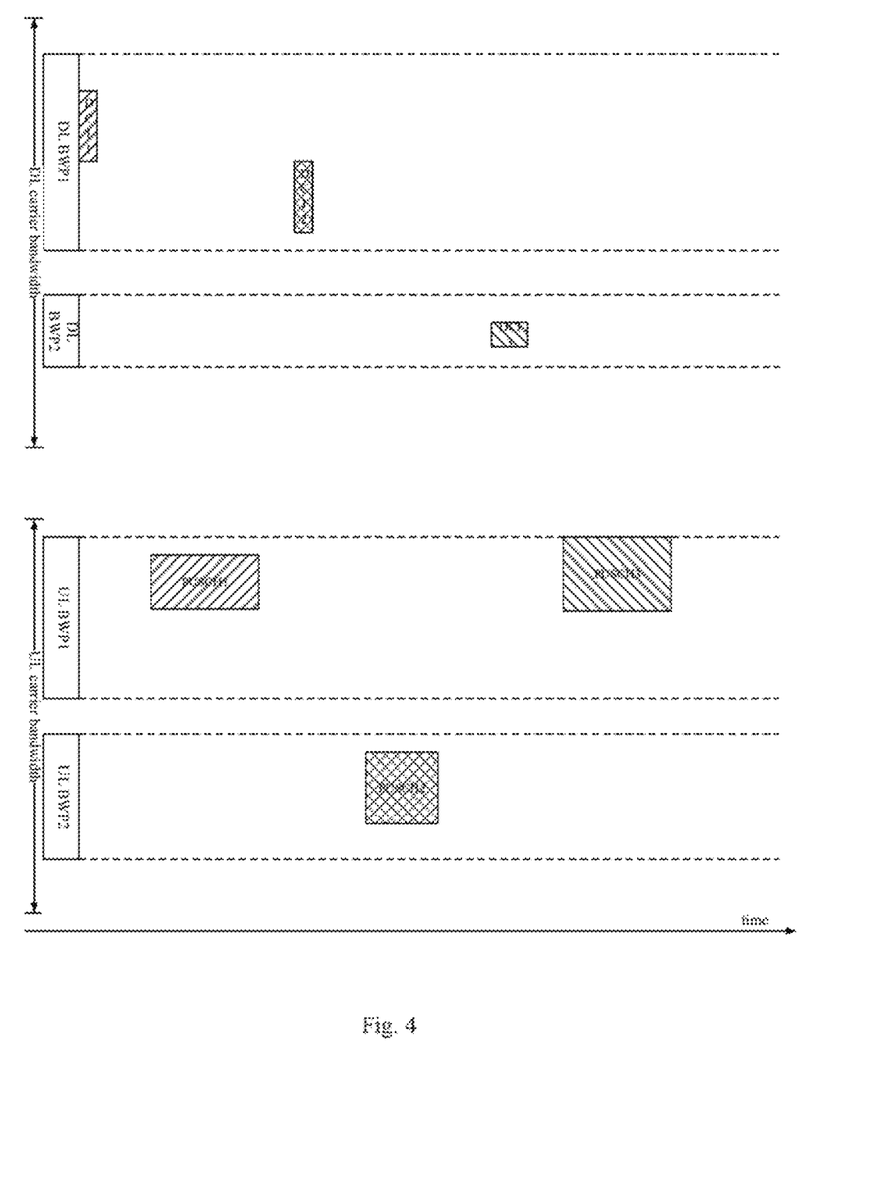
FIG. 4 is a schematic view showing a situation where two BWPs are configured by the network device for the UE during the FDD uplink scheduling.

In this embodiment, the resource allocation determination method will be described by taking the FDD uplink scheduling as an example. It is presumed that two groups of BWPs, i.e., a UL BWP 1 and a UL BWP 2, are configured by the network device for the UE, as shown in FIG. 4.

The UE may determine the quantity N of the bits for the resource allocation indication field in the DCI based on a current active UL BWP. The DCI may be used to indicate the BWP where the PUSCH is located. The UE may determine the frequency-domain resource for the PUSCH in the BWP indicated by the DCI where the PUSCH is located based on the N-bit information about the resource allocation indication field in the DCI.

The method for determining the quantity of the bits for the resource allocation indication field based on the BWP and determining the allocation of the frequency-domain resources in the BWP may refer to that in the first embodiment, and thus will not be particularly defined herein.

Third Embodiment

Figure 5:
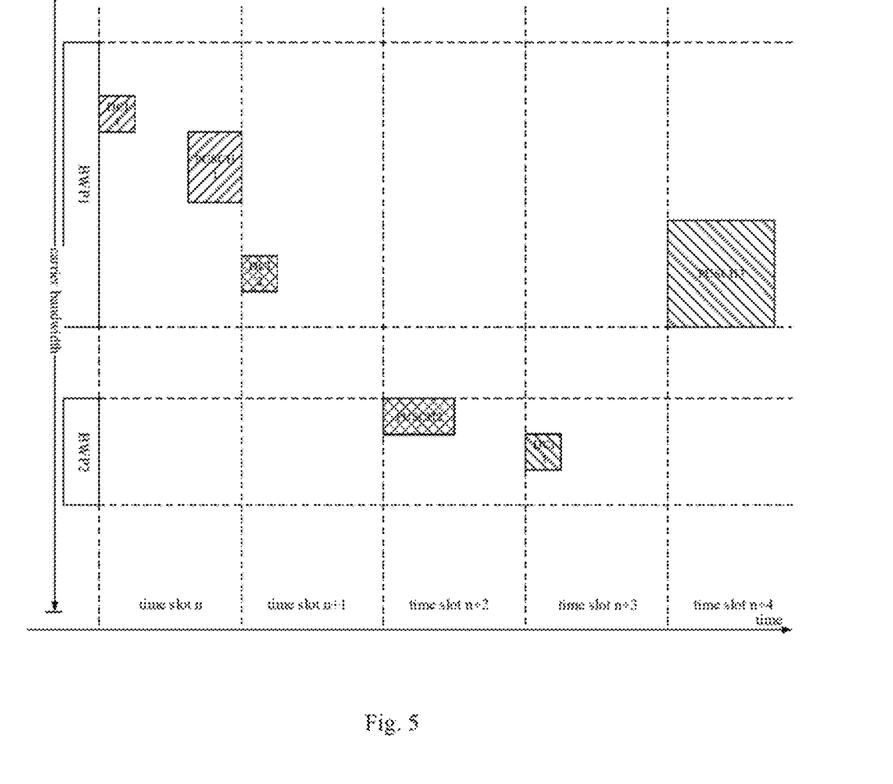
FIG. 5 is a schematic view showing a situation where two BWPs are configured by the network device for the UE during the TDD uplink scheduling.

In this embodiment, the resource allocation determination method will be described by taking TDD uplink scheduling as an example. In a TDD system, the UL BWPs and the DL BWPs may be the same, and they may be switched in a time-division multiplexing manner, as shown in FIG. 5.

At this time, the TDD uplink scheduling may be similar to the downlink scheduling in the first embodiment, which will thus not be particularly defined herein.

Figure 6:
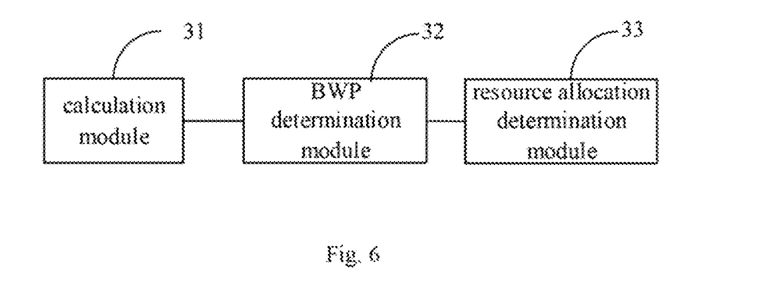
FIGS. 6 and 8 are block diagrams of the UE according to one embodiment of the present disclosure.

The present disclosure further provides in some embodiments a UE which, as shown in FIG. 6, includes: a calculation module 31 configured to determine the quantity N of bits of a resource allocation indication field in DCI; a BWP determination module 32 configured to determine a BWP where a data channel is located based on the DCI; and a resource allocation determination module 33 configured to determine resource allocation for the data channel in the BWP where the data channel is located based on information about the resource allocation indication field in the DCI.

According to the embodiments of the present disclosure, it is able to determine a size of the resource allocation indication field in the DCI based on a current BWP, rather than to determine the size of the resource allocation indication field for each BWP by a BWP with the maximum quantity of the bits, thereby to reduce the overhead of air-interface signaling, and improve a resource utilization rate of a system.

In some embodiments of the present disclosure, the calculation module 31 is specifically configured to determine the quantity N of the bits of the resource allocation indication field in the DCI.

In a possible embodiment of the present disclosure, the UE may further include: the BWP determination module 32 configured to determine the BWP where the data channel is located based on the DCI; and the resource allocation determination module 33 configured to determine the resource allocation for the data channel in the BWP where the data channel is located based on information about the resource allocation indication field in the DCI.

In a possible embodiment of the present disclosure, the resource allocation determination module may include: a first calculation unit configured to determine the quantity L of RBGs in the BWP where the data channel is located; and a first determination unit configured to, when N is not smaller than L, determine the resource allocation of L RBGs for the data channel in the BWP where the data channel is located based on the information about the resource allocation indication field in the DCI, and when N is smaller than L, determine the resource allocation of N RBGs for the data channel in the BWP where the data channel is located based on the information about the resource allocation indication field in the DCI.

In some embodiments of the present disclosure, the N RBGs may be N RBGs having highest frequencies or lowest frequencies in the L RBGs.

In a possible embodiment of the present disclosure, the resource allocation determination module may include: a second calculation unit configured to determine the quantity M of the bits for the resource allocation in the BWP where the data channel is located; and a second determination unit configured to, when N is not smaller than M, determine the allocation of frequency-domain resources for the data channel in the BWP where the data channel is located based on information about the M bits in the N bits of the resource allocation indication field in the DCI, and when N is smaller than M, determine the allocation of the frequency-domain resources for the data channel in the BWP where the data channel is located based on information about the N bits of the resource allocation indication field in the DCI.

In some embodiments of the present disclosure, when N is not smaller than M, the M bits may be M most significant or least significant bits in the N bits.

In some embodiments of the present disclosure, when N is smaller than M, the N bits may be N least significant or most significant bits in the M bits.

It should be appreciated that, the UE in the embodiments of the present disclosure is capable of implementing the above-mentioned resource allocation determination method, so the implementation of the UE may refer to that of the resource allocation determination method, with a same or similar beneficial effect.

In addition, functional modules in the embodiments of the present disclosure may be integrated into a processing module, or the functional modules may exist independently, or two or more functional modules may be combined together. These modules may be implemented in the form of hardware, or hardware plus software.

Figure 7:
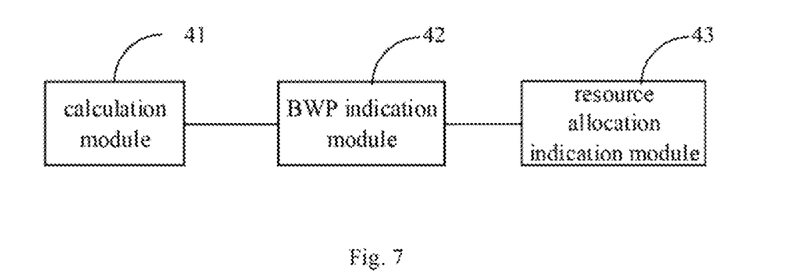
FIGS. 7 and 9 are block diagrams of the network device according to one embodiment of the present disclosure.

The present disclosure further provides in some embodiments a network device which, as shown in FIG. 7, includes: a calculation module 41 configured to determine the quantity N of bits of a resource allocation indication field in DCI; a BWP indication module 42 configured to indicate a BWP where a data channel is located through the DCI; and a resource allocation indication module 43 configured to indicate resource allocation for the data channel in the BWP where the data channel is located in the resource allocation indication field through the N bits.

According to the embodiments of the present disclosure, it is able to determine a size of the resource allocation indication field in the DCI based on a current BWP, rather than to determine the size of the resource allocation indication field for each BWP by a BWP with the maximum quantity of the bits, thereby to reduce the overhead of air-interface signaling, and improve a resource utilization rate of a system.

In some embodiments of the present disclosure, the calculation module 41 is specifically configured to determine the quantity N of the bits of the resource allocation indication field in the DCI.

In a possible embodiment of the present disclosure, the network device may further include: the BWP indication module 42 configured to indicate the BWP where the data channel is located through the DCI; and the resource allocation indication module 43 configured to indicate the resource allocation for the data channel in the BWP where the data channel is located in the resource allocation indication field through the N bits.

In a possible embodiment of the present disclosure, the resource allocation indication module may include: a first calculation unit configured to determine the quantity L of RBGs in the BWP where the data channel is located; and a first indication unit configured to, when N is not smaller than L, indicate the resource allocation of L RBGs for the data channel in the BWP where the data channel is located in the resource allocation indication field through the N bits, and when N is smaller than L, indicate the resource allocation of N RBGs for the data channel in the BWP where the data channel is located in the resource allocation indication field through the N bits.

In some embodiments of the present disclosure, the N RBGs may be N RBGs having highest or lowest frequencies in the L RBGs.

In a possible embodiment of the present disclosure, the resource allocation indication module may include: a second calculation unit configured to determine the quantity M of bits for resource allocation in the BWP where the data channel is located; and a second indication unit configured to, when N is not smaller than M, indicate the allocation of frequency-domain resources for the data channel in the BWP where the data channel is located based on information about the M bits in the N bits of the resource allocation indication field in the DCI, and when N is smaller than M, indicate the allocation of the frequency-domain resources for the data channel in the BWP where the data channel is located based on information about the N bits of the resource allocation indication field in the DCI.

In a possible embodiment of the present disclosure, when N is not smaller than M, the M bits may be M most or least significant bits in the N bits.

In a possible embodiment of the present disclosure, when N is smaller than M, the N bits may be N least or most significant bits in the M bits.

It should be appreciated that, the network device in the embodiments of the present disclosure is capable of implementing the above-mentioned resource allocation indication method, so the implementation of the UE may refer to that of the resource allocation indication method, with a same or similar beneficial effect.

In addition, functional modules in the embodiments of the present disclosure may be integrated into a processing module, or the functional modules may exist independently, or two or more functional modules may be combined together. These modules may be implemented in the form of hardware, or hardware plus software.

Figure 8:
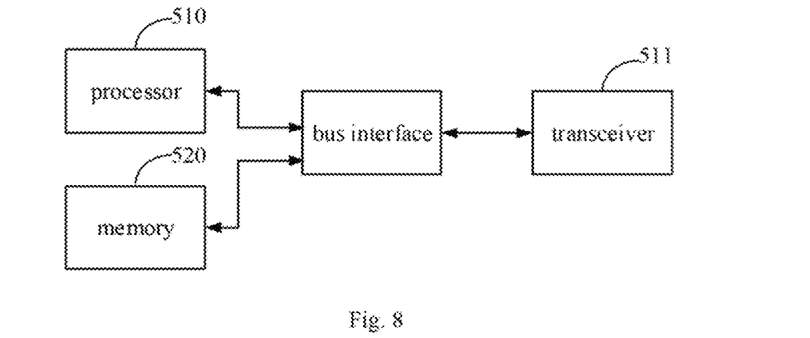

The present disclosure further provides in some embodiments a UE which, as shown in FIG. 8, includes a processor 510 configured to read a program stored in the memory 520, so as to: determine a BWP where a control channel carrying DCI is located; and determine the quantity N of bits of a resource allocation indication field in the DCI based on the BWP where the control channel is located.

In some embodiments of the present disclosure, the UE may further include a transceiver 511, and the processor 510 is further configured to read the program in the memory 520, so as to receive the DCI through the transceiver 511. The transceiver 511 is configured to receive the DCI under the control of the processor 510.

In FIG. 8, bus architecture may include a number of buses and bridges connected to each other, so as to connect various circuits for one or more processors 510 and one or more memories 520. In addition, as is known in the art, the bus architecture may be used to connect any other circuits, such as a circuit for a peripheral device, a circuit for a voltage stabilizer and a power management circuit. A bus interface may be provided, and the transceiver 511 may consist of a plurality of elements, i.e., a transmitter and a receiver for communication with any other devices over a transmission medium. The processor 510 may take charge of managing the bus architecture as well as general processings. The memory 520 may store therein data for the operation of the processor 510.

The processor 510 is further configured to read the computer program so as to determine the quantity N of the bits of the resource allocation indication field in the DCI.

The processor 510 is further configured to read the computer program so as to: determine a BWP where the a data channel is located based on the DCI; and determine the resource allocation for the data channel in the BWP where the data channel is located based on information about the resource allocation indication field in the DCI.

The processor 510 is further configured to read the computer program, so as to: determine the quantity L of RBGs in the BWP where the data channel is located; when N is not smaller than L, determine the resource allocation of L RBGs for the data channel in the BWP where the data channel is located based on the information about the resource allocation indication field in the DCI; and when N is smaller than L, determine the resource allocation of N RBGs for the data channel in the BWP where the data channel is located based on the information about the resource allocation indication field in the DCI.

The N RBGs may be N RBGs having highest or lowest frequencies in the L RBGs.

The processor 510 is further configured to read the computer program, so as to: determine the quantity M of bits for the resource allocation in the BWP where the data channel is located; when N is not smaller than M, determine the allocation of frequency-domain resources for the data channel in the BWP where the data channel is located based on information about the M bits in the N bits of the resource allocation indication field in the DCI; and when N is smaller than M, determine the allocation of the frequency-domain resources for the data channel in the BWP where the data channel is located based on information about the N bits of the resource allocation indication field in the DCI.

In some embodiments of the present disclosure, when N is not smaller than M, the M bits may be M most significant or least significant bits in the N bits. When N is smaller than M, the N bits may be N least significant or most significant bits in the M bits.

Figure 9:
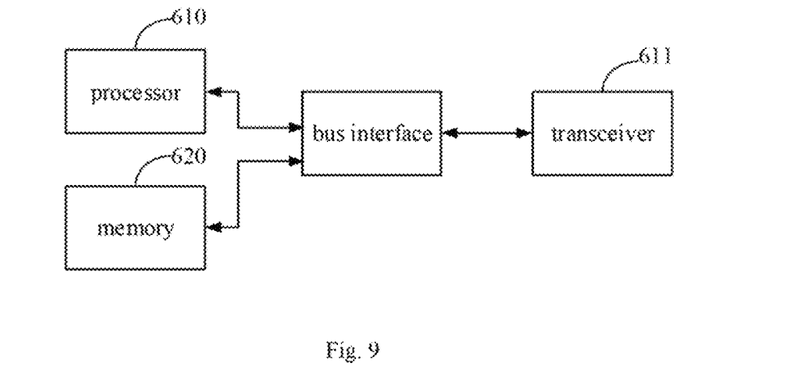

The present disclosure further provides in some embodiments a network device which, as shown in FIG. 9, includes a processor 610 configured to read a program in a memory 620, so as to determine the quantity N of bits of a resource allocation indication field in DCI.

In some embodiments of the present disclosure, the network device may further include a transceiver 611. The processor 610 is further configured to read the program in the memory 520, so as to transmit the DCI through the transceiver 611. The transceiver 611 is configured to transmit the DCI under the control of the processor 610.

In FIG. 9, bus architecture may include a number of buses and bridges connected to each other, so as to connect various circuits for one or more processors 610 and one or more memories 620. In addition, as is known in the art, the bus architecture may be used to connect any other circuits, such as a circuit for a peripheral device, a circuit for a voltage stabilizer and a power management circuit. A bus interface may be provided, and the transceiver 611 may consist of a plurality of elements, i.e., a transmitter and a receiver for communication with any other devices over a transmission medium. The processor 610 may take charge of managing the bus architecture as well as general processings. The memory 620 may store therein data for the operation of the processor 610.

The processor 610 is further configured to read the computer program so as to determine the quantity N of the bits of the resource allocation indication field in the DCI.

The processor 610 is further configured to read the computer program, so as to indicate a BWP where a data channel is located through the DCI, and indicate resource allocation for the data channel in the BWP where the data channel is located in the resource allocation indication field through the N bits.

The processor 610 is further configured to read the computer program, so as to: determine the quantity L of RBGs in the BWP where the data channel is located; when N is not smaller than L, indicate the resource allocation of L RBGs for the data channel in the BWP where the data channel is located in the resource allocation indication field through the N bits; and when N is smaller than L, indicate the resource allocation of N RBGs for the data channel in the BWP where the data channel is located in the resource allocation indication field through the N bits.

In some embodiments of the present disclosure, the N RBGs may be N RBGs having highest or lowest frequencies in the L RBGs.

The processor 610 is further configured to read the computer program, so as to: determine the quantity M of bits for resource allocation in the BWP where the data channel is located; when N is not smaller than M, indicate the allocation of frequency-domain resources for the data channel in the BWP where the data channel is located based on information about the M bits in the N bits of the resource allocation indication field in the DCI; and when N is smaller than M, indicate the allocation of the frequency-domain resources for the data channel in the BWP where the data channel is located based on information about the N bits of the resource allocation indication field in the DCI.

In some embodiments of the present disclosure, when N is not smaller than M, the M bits may be M most significant or least significant bits in the N bits.

In some embodiments of the present disclosure, when N is smaller than M, the N bits may be N least significant or most significant bits in the M bits.

The present disclosure further provides in some embodiments a computer-readable storage medium storing therein a computer program. The computer program is executed by a processor so as to determine the quantity N of bits of a resource allocation indication field in DCI.

In some embodiments of the present disclosure, the computer program is specifically executed by the processor so as to determine the quantity N of the bits of the resource allocation indication field in the DCI.

In some embodiments of the present disclosure, the computer program is further executed by the processor so as to: determine a BWP where a data channel is located based on the DCI; and determine resource allocation for the data channel in the BWP where the data channel is located based on information about the resource allocation indication field in the DCI.

In some embodiments of the present disclosure, the computer program is executed by the processor so as to: determine the quantity L of RBGs in the BWP where the data channel is located; when N is not smaller than L, determine the resource allocation of L RBGs for the data channel in the BWP where the data channel is located based on the information about the resource allocation indication field in the DCI; and when N is smaller than L, determine the resource allocation of N RBGs for the data channel in the BWP where the data channel is located based on the information about the resource allocation indication field in the DCI.

The N RBGs may be N RBGs having highest or lowest frequencies in the L RBGs.

In some embodiments of the present disclosure, the computer program is executed by the processor so as to: determine the quantity M of bits for the resource allocation in the BWP where the data channel is located; when N is not smaller than M, determine the allocation of frequency-domain resources for the data channel in the BWP where the data channel is located based on information about the M bits in the N bits of the resource allocation indication field in the DCI; and when N is smaller than M, determine the allocation of the frequency-domain resources for the data channel in the BWP where the data channel is located based on information about the N bits of the resource allocation indication field in the DCI.

In some embodiments of the present disclosure, when N is not smaller than M, the M bits may be M most significant or least significant bits in the N bits, and when the N is smaller than M, the N bits may be N least significant or most significant bits in the M bits.

The present disclosure further provides in some embodiments a computer-readable storage medium storing therein a computer program. The computer program is executed by a processor so as to determine the quantity N of bits of a resource allocation indication field in DCI.

In some embodiments of the present disclosure, the computer program is specifically executed by the processor so as to determine the quantity N of the bits of the resource allocation indication field in the DCI.

In some embodiments of the present disclosure, the computer program is further executed by the processor so as to indicate a BWP where a data channel is located through the DCI, and indicate resource allocation for the data channel in the BWP where the data channel is located in the resource allocation indication field through N bits.

In some embodiments of the present disclosure, the computer program is further executed by the processor, so as to: determine the quantity L of RBGs in the BWP where the data channel is located; when N is not smaller than L, indicate the resource allocation of L RBGs for the data channel in the BWP where the data channel is located in the resource allocation indication field through the N bits; and when N is smaller than L, indicate the resource allocation of N RBGs for the data channel in the BWP where the data channel is located in the resource allocation indication field through the N bits.

The N RBGs may be N RBGs having highest or lowest frequencies in the L RBGs.

In some embodiments of the present disclosure, the computer program is further executed by the processor so as to: determine the quantity M of bits for resource allocation in the BWP where the data channel is located; when N is not smaller than M, indicate the allocation of frequency-domain resources for the data channel in the BWP where the data channel is located based on information about the M bits in the N bits of the resource allocation indication field in the DCI; and when N is smaller than M, indicate the allocation of the frequency-domain resources for the data channel in the BWP where the data channel is located based on information about the N bits of the resource allocation indication field in the DCI.

In some embodiments of the present disclosure, when N is not smaller than M, the M bits may be M most significant or least significant bits in the N bits, and when N is smaller than M, the N bits may be N least significant or most significant bits in the M bits.

The computer-readable storage medium may include volatile or nonvolatile, mobile or immobile storage medium capable of storing therein information using any method or technique. The information may be a computer-readable instruction, a data structure, a program or any other data. The computer-readable storage medium may include, but not limited to, a Random Access Memory (e.g., Phase Change Random Access Memory (PRAM), SRAM or Dynamic Random Access Memory (DRAM)), a Read Only Memory (ROM) (e.g., an Electrically Erasable Programmable Read Only Memory (EEPROM), a flash memory, a Compact Disc Read Only Memory (CD-ROM) or a Digital Video Disk (DVD)), a magnetic storage device (e.g., a cassette magnetic tape or a magnetic disk), or any other non-transmission medium capable of storing therein information which can be accessed by a computing device. As defined in the present disclosure, the computer-readable storage medium may not include any transitory media, e.g., modulated data signal or carrier.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A resource allocation determination method applied for a User Equipment (UE), comprising:
   determining a quantity N of bits of a resource allocation indication field in Downlink Control Information (DCI);
   determining a Bandwidth Part (BWP) where a data channel is located based on the DCI; and
   determining resource allocation for the data channel in the BWP where the data channel is located based on information about the resource allocation indication field in the DCI;
   wherein the determining the resource allocation for the data channel in the BWP where the data channel is located based on the information about the resource allocation indication field in the DCI comprises:
   determining a quantity L of Resource Block Groups (RBGs) in the BWP where the data channel is located;
   when N is not smaller than L, determining resource allocation of L RBGs for the data channel in the BWP where the data channel is located based on the information about the resource allocation indication field in the DCI; and
   when N is smaller than L, determining resource allocation of N RBGs for the data channel in the BWP where the data channel is located based on the information about the resource allocation indication field in the DCI;
   wherein the determining resource allocation of the N RBGs for the data channel in the BWP where the data channel is located based on the information about the resource allocation indication field in the DCI comprises:
   determining N RBGs having highest frequencies in the L RBGs as the N RBGs, or
   determining N RBGs having lowest frequencies in the L RBGs as the N RBGs;
   or,
   wherein the determining resource allocation for the data channel in the BWP where the data channel is located based on the information about the resource allocation indication field in the DCI comprises:
   determining a quantity M of bits for the resource allocation in the BWP where the data channel is located;
   when N is not smaller than M, determining allocation of frequency-domain resources for the data channel in the BWP where the data channel is located based on information about the M bits in the N bits of the resource allocation indication field in the DCI; and
   when N is smaller than M, determining allocation of the frequency-domain resources for the data channel in the BWP where the data channel is located based on information about the N bits of the resource allocation indication field in the DCI.

2. The resource allocation determination method according to claim 1, wherein when N is not smaller than M, the determining allocation of the frequency-domain resources for the data channel in the BWP where the data channel is located based on the information about the M bits in the N bits of the resource allocation indication field in the DCI comprises:
   determining M most significant bits in the N bits as the M bits, or
   determining M least significant bits in the N bits as the M bits.

3. The resource allocation determination method according to claim 1, wherein when N is smaller than M, the determining allocation of the frequency-domain resources for the data channel in the BWP where the data channel is located based on the information about the N bits of the resource allocation indication field in the DCI comprises:
   determining N least significant bits in the M bits as the N bits, or
   determining N most significant bits in the M bits as the N bits.

4. A resource allocation indication method applied for a network device, comprising:
   determining a quantity N of bits of a resource allocation indication field in DCI;
   indicating a BWP where a data channel is located through the DCI; and
   indicating resource allocation for the data channel in the BWP where the data channel is located in the resource allocation indication field through the N bits;
   wherein the indicating the resource allocation for the data channel in the BWP where the data channel is located in the resource allocation indication field through the N bits comprises:
   determining a quantity L of RBGs in the BWP where the data channel is located;
   when N is not smaller than L, indicating resource allocation of L RBGs for the data channel in the BWP where the data channel is located in the resource allocation indication field through the N bits; and
   when N is smaller than L, indicating the resource allocation of N RBGs for the data channel in the BWP where the data channel is located in the resource allocation indication field through the N bits;
   wherein the indicating resource allocation of the N RBGs for the data channel in the BWP where the data channel is located in the resource allocation indication field through the N bits comprises:
   determining N RBGs having highest frequencies in the L RBGs as the N RBGs, or
   determining N RBGs having lowest frequencies in the L RBGs as the N RBGs;
   or,
   wherein the indicating resource allocation for the data channel in the BWP where the data channel is located in the resource allocation indication field through the N bits comprises:

determining a quantity M of bits for resource allocation in the BWP where the data channel is located;

when N is not smaller than M, indicating allocation of frequency-domain resources for the data channel in the BWP where the data channel is located based on information about the M bits in the N bits of the resource allocation indication field in the DCI; and when N is smaller than M, indicating allocation of the frequency-domain resources for the data channel in the BWP where the data channel is located based on information about the N bits of the resource allocation indication field in the DCI.

5. The resource allocation indication method according to claim 4, wherein when N is not smaller than M, the indicating allocation of the frequency-domain resources for the data channel in the BWP where the data channel is located based on the information about the M bits in the N bits of the resource allocation indication field in the DCI comprises:

determining M most significant bits in the N bits as the M bits, or determining M least significant bits in the N bits as the M bits.

6. The resource allocation indication method according to claim 4, wherein when N is smaller than M, the indicating allocation of the frequency-domain resources for the data channel in the BWP where the data channel is located based on the information about the N bits of the resource allocation indication field in the DCI comprises:

determining N least significant bits in the M bits as the N bits, or determining N most significant bits in the M bits as the N bits.

7. A UE, comprising a memory, a processor, a transceiver, and a computer program stored in the memory and executed by the processor, wherein the processor is configured to execute the computer program so as to implement the resource allocation determination method according to claim 1.

8. The UE according to claim 7, wherein when N is not smaller than M, the determining allocation of the frequency-domain resources for the data channel in the BWP where the data channel is located based on the information about the M bits in the N bits of the resource allocation indication field in the DCI comprises:

determining M most significant bits in the N bits as the M bits, or determining M least significant bits in the N bits as the M bits.

9. The UE according to claim 7, wherein when N is smaller than M, the determining allocation of the frequency-domain resources for the data channel in the BWP where the data channel is located based on the information about the N bits of the resource allocation indication field in the DCI comprises:

determining N least significant bits in the M bits as the N bits, or determining N most significant bits in the M bits as the N bits.

10. A network device, comprising a memory, a processor, a transceiver, and a computer program stored in the memory and executed by the processor, wherein the processor is configured to execute the computer program so as to implement the resource allocation indication method according to claim 4.

11. The network device according to claim 10, wherein when N is not smaller than M, the indicating allocation of the frequency-domain resources for the data channel in the BWP where the data channel is located based on the information about the M bits in the N bits of the resource allocation indication field in the DCI comprises:

determining M most significant bits in the N bits as the M bits, or determining M least significant bits in the N bits as the M bits.

12. The network device according to claim 10, wherein when N is smaller than M, the indicating allocation of the frequency-domain resources for the data channel in the BWP where the data channel is located based on the information about the N bits of the resource allocation indication field in the DCI comprises:

determining N least significant bits in the M bits as the N bits, or determining N most significant bits in the M bits as the N bits.

* * * * *